UNITED STATES PATENT OFFICE.

HIOSUKE MIZUHARA, OF SAN FRANCISCO, CALIFORNIA.

CEMENT.

SPECIFICATION forming part of Letters Patent No. 559,738, dated May 5, 1896.

Application filed November 4, 1895. Serial No. 567,835. (No specimens.)

*To all whom it may concern:*

Be it known that I, HIOSUKE MIZUHARA, a native of Japan, residing in the city and county of San Francisco, State of California, have invented a new and useful Improvement in Cement for Joining Earthenware; and I hereby declare the following to be a full, clear, and exact description of my improvement, with the manner of compounding and applying the same.

My improved cement for earthenware consists of the following ingredients or components, to wit: In forty-six parts of the same there are, by weight, white earth of Japan, (soft,) one part; white earth of Japan, (hard,) one part; shellac, (dissolved,) twelve parts; camphor, (gum,) four parts; alcohol, twenty-eight parts. In the Japanese language the hard white earth of Japan is called "shirokutsuchi" and the soft white earth of Japan is called "tonotsuchi." These ingredients or elements, which may be slightly varied without much affecting the properties of my improved cement, are compounded in the following manner:

The various ingredients named are placed in an open vessel, heated, and stirred until they assimilate and become a viscid fluid, which after cooling can be placed in sealed bottles ready for use. The period of boiling required to reduce and assimilate the ingredients is about twenty minutes. The boiling-point of the mixture corresponds to that of the alcohol contained, and need not be exceeded in order to cause a complete union of the ingredients; but no harm will result from a higher temperature if ignition is guarded against. The shellac being slow to dissolve, I first reduce it by immersion in alcohol until softened and dissolved to a viscid fluid. The other elements do not require preparation or mixing. The resulting compound is a viscous liquid that is applied to the fractured surfaces of earthenware by means of a brush, or in any other suitable manner. The surfaces are then pressed together, so as to expel any surplus cement in the joint, after which the earthenware is heated at the joint by means of a flame-lamp, gas-burner, or in any other manner most convenient up to a point that will cause the cement to set and harden, after which the vessel or object mended or cemented is ready for use.

An especial use of my improved cement is in joining fractured porcelain, the material when hardened being in a degree translucent and not exposing the cracks.

In joining or mending earthenware of any strong color a corresponding pigment can be incorporated in the cement, so the cracks or seams mended will not be conspicuous.

The cement when prepared should be kept sealed, so as to prevent the escape of the volatile elements contained, but is not affected by such exposure as is necessary in its application.

A modification in the mixing of the proportions may be permitted without departing from the invention, and either one or both of the white earths may be employed.

Having thus described my improved cement for earthenware and the manner of preparing and applying the same, what I claim as new, and desire to secure by Letters Patent, is—

1. The herein-described composition cement for earthenware, consisting of the earth of Japan, shellac, camphor and alcohol, substantially as described.

2. A composition for earthenware-cement, consisting of a mixture of white earth of Japan (soft), white earth of Japan (hard), shellac, camphor, and alcohol.

In testimony whereof I have hereunto affixed my signature in the presence of two witnesses.

HIOSUKE MIZUHARA.

Witnesses:
  ALFRED A. ENQUIST,
  WILSON D. BENT, Jr.